Figure 1:
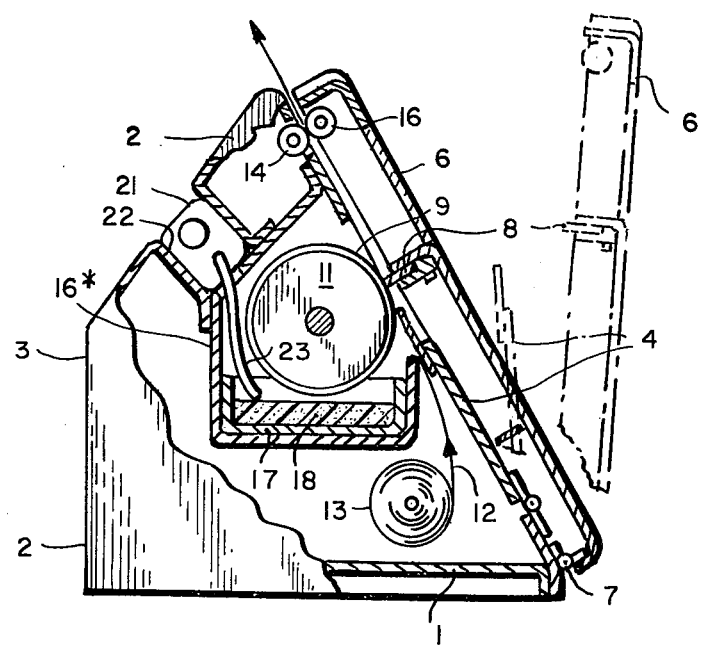

United States Patent [19]
Simpkins

[11] 4,126,869
[45] Nov. 21, 1978

[54] CHAFF TRAY FOR FACSIMILE RECORDER

[75] Inventor: Frederick W. Simpkins, Hudson, Mass.

[73] Assignee: Alden Research Foundation, Westboro, Mass.

[21] Appl. No.: 754,754

[22] Filed: Dec. 27, 1976

[51] Int. Cl.² ............................................. G01D 15/06
[52] U.S. Cl. ................................... 346/165; 346/145; 346/146
[58] Field of Search .................. 346/146, 101, 139 C, 346/139 R, 165, 145

[56] References Cited
U.S. PATENT DOCUMENTS
3,611,425   10/1971   Alden ................................. 346/101

*Primary Examiner*—Joseph W. Hartary
*Attorney, Agent, or Firm*—Grover and Meegan

[57] ABSTRACT

A facsimile recorder of moist electrolytic recording paper includes a tray under the helical scanning electrode which traverses the paper. The tray performs the dual function of collecting chaff abraded from the paper by the scanning electrode and of containing a supply of moisture for the paper.

3 Claims, 2 Drawing Figures

CHAFF TRAY FOR FACSIMILE RECORDER

BACKGROUND OF THE INVENTION

In recording graphic electrical signals on a moist electrolytic facsimile recording web or paper a scanning electrode in a recording compartment effectively traverses a scanning zone across the paper while applying the signals thereto. The scanning electrode may be a conductor helically carried on a rotating drum as in U.S. Pat. Nos. 3,417,405 and 3,736,594, or a stylus carried on an orbiting belt as shown in U.S. Pat. No. 2,879,129. In either case the scanning electrode abrades paper fibers and other recording by products from the paper contaminating the compartment enclosing the scanning electrode. The abrasion problem is particularly acute when the paper is advanced intermittently past the electrode by stopping feed through the recording zone between periods of recording. In this case the paper not only tends to become dry but is also repeatedly abraded along one scanning line of the electrode, and paper chaff is dispersed in the recording compartment, clogging the scanning feed means and the recorder in general and building up on the recording electrode by drying thereon.

It is known to provide a source of humidity in the recording compartment of a facsimile recorder but the object of the present invention is to overcome the chaff dispersion problem in a way which also avoids drying of the recording compartment.

STATEMENT OF INVENTION

According to the invention apparatus for recording graphic electrical signals on a moist recording web comprising a frame, including means for holding a supply of recording web, means on the frame for feeding the web through a recording zone, means on the frame for recording on the web in said zone including marking means moving across the web, and a tray below the marking means for receiving chaff removed from the web by the marking means, said tray being removably mounted on the frame for clearing chaff.

Further according to the invention the tray is a container of a supply of moisture for the recording zone.

DRAWINGS

Figure 2:
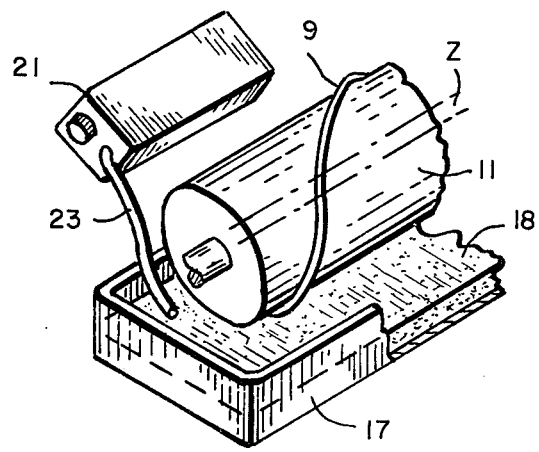

FIG. 1 is a side elevation of a facsimile recorder including a chaff tray according to the invention, shown partly in section; and FIG. 2 is an isometric view of the chaff tray of FIG. 1.

DESCRIPTION

The facsimile recorder shown in FIGS. 1 and 2 includes a housing or frame comprising a base 1, side walls 2, a rear wall 3 and a front wall 4 to which a cover 6 is pivotted at 7. The cover mounts a linear electrode 8 which cooperates in recording with a helical scanning electrode 9 curved around a drum 11 driven by a motor (not shown), so that the helical electrode effectively traverses the linear electrode and the paper. Moist electrolytic recording paper or web 12 is drawn from a humidified supply roll 13 by a motor driven roll 14 on the base and an idler roll 16 on the cover. As the paper is drawn through a recording zone Z where the helical electrode traverses the linear electrode, electrical current signals are applied to the electrodes and are marked on the paper line by line. In some cases the signals for a line are stored in an electronic buffer which accumulates the signals until a full line of signals is stored and then reads out the signals during a scan line. While the buffer is filling up and not reading out, the moist recording paper must be unmoving, waiting for the marking signal line. But the scanning electrode previously has been carefully synchronized and phased with a remote transmitter from which the marking signals are received in the buffer and can not be stopped when paper feed is stopped. Consequently the paper is stopped in the recording zone Z where it not only tends to lose its moisture by evaporation but is repeatedly rubbed along a narrow scan line by the moving scanning electrode. Paper and electrolytic residues are abraded from the stationary paper and would normally be scattered around the recording apparatus, and progressively dry on the helical scanning electrode 9 forming an insulating coating which prevents the electrical marking current from flowing through the paper between the electrodes.

However according to the present invention the helical electrode 9 and the recording zone Z is surrounded by compartment walls 16 which also form a support for a chaff collecting and humidifying tray 17. A high level of humidity is maintained in the compartment by a water soaked sponge or like moisture-retentive strip 18 fitting the bottom of the tray. The recorder housing rear wall 3 includes a recess 22 easily accessible from the back for receiving a plastic bottle 21 of water. A tube 23 runs from the bottle to the tray for gravity feed of water. The water flow is controlled by the water level in the tray or by a pressure sensitive valve at the end of the tube. The tray 17 is slidingly received in the compartment 16 and is readily removed through the housing side wall 2 shown in FIG. 1.

The constantly replenished supply of water in the chaff tray 17 maintains both the paper 12 and the helical electrode 9 moistened when paper feed is stopped. Such residue as may be abraded from the paper does not tend to dry and adhere to the helical scanning electrode. The same is true of styli on a scanning belt. Instead the residue is directed into the chaff tray where it can accumulate without clogging working mechanisms until the tray is withdrawn for cleaning.

It should be understood that the present disclosure is for the purpose of illustration only and that this invention includes all modifications and equivalents which fall within the scope of the appended claims.

I claim:

1. Apparatus for recording graphic electrical signals on a moist recording web comprising:
   a frame including means for holding a supply of recording web;
   means on the frame for feeding the web through a recording zone;
   means on the frame for recording on the web in said zone including marking means moving across the web, and
   a removable tray located directly below the marking means for receiving chaff removed from the web by the marking means and for holding a supply of water, said tray interposed between the moving marking means and the web supply holding means, whereby abraded chaff from the recording web is collected and the recording web is moisturized.

2. Apparatus according to claim 1 further including a reservoir of water and means for supplying water from the reservoir to the tray, the supplying means allowing removal of the tray.

3. Apparatus according to claim 2 where in the water supplying means includes a flexible tube.

* * * * *